United States Patent [19]

Rauch et al.

[11] Patent Number: 4,816,119
[45] Date of Patent: Mar. 28, 1989

[54] PROCESS FOR PRODUCTION OF MAGNETIC MEDIA

[75] Inventors: Gary C. Rauch, Colorado Springs, Colo.; Young David J., Mesa, Ariz.; Earl R. C. Johns, Colorado Springs, Colo.; Robert L. Stone, Monument, Colo.; Carolyn A. Messinger, Colorado Springs, Colo.

[73] Assignee: Digital Equipment Corp., Maynard, Mass.

[21] Appl. No.: 92,952

[22] Filed: Sep. 4, 1987

[51] Int. Cl.$^4$ .............................................. C25D 5/24
[52] U.S. Cl. ................................... 204/29; 204/38.3; 204/38.4; 204/44.7; 427/129; 427/131; 427/132; 427/438

[58] Field of Search ............... 427/129, 131, 132, 438; 204/29, 38.3, 38.4, 44.7

[56] References Cited

U.S. PATENT DOCUMENTS 4,390,562  6/1983  Yanagisawa ........................ 427/11
4,581,109  4/1986  Goor et al. ........................ 209/38.4

Primary Examiner—R. L. Andrews
Attorney, Agent, or Firm—Kenyon & Kenyon

[57] ABSTRACT

This invention comprises the use, during the plating processing of thin-film magnetic recording media, of an oxidizing treatment immediately preceding the electroplating of the magnetic layer. This oxidizing treatment can be controlled to produce desired high levels of coercive force and low levels of media noise.

25 Claims, 8 Drawing Sheets

FIG. I

PROCESS FOR PRODUCTION OF MAGNETIC MEDIA

BACKGROUND OF THE INVENTION

The purpose of the invention is to develop desirable magnetic recording properties in plated thin-film magnetic recording media. The principal properties which can be controlled by this new process are media noise, which can be significantly reduced from the level obtained by prior art methods, and coercive force, which can be controlled over a wide range.

The growth mode of thin films deposited by plating or other methods can be controlled by characteristics of the surface upon which they are deposited. In the prior-art plating processes no special effort is made to manipulate the surface upon which the magnetic layer is deposited, other than to assure its cleanliness. Using the previous processes, adequate properties are sometimes obtained, but the product is not easily made to be consistent over time, nor have the sources of the inconsistencies been determined. The prior processes also yield inadequate control over coercive force, and media noise is not as low as desired. In the prior plating practice of U.S. Pat. No. 4,581,109, a nominally clean surface of electroplated Ni-P is used as the underlayer upon which a Co-Ni-P magnetic layer is electroplated. The electroplated Ni-P layer is deposited on a polished electroless Ni-P layer.

SUMMARY OF THE INVENTION

In the practice of this invention, incidental variations in underlayer surface condition are overcome by deliberately treating the surface upon which the magnetic layer is to be deposited, before deposition of the magnetic layer, to produce an oxidized film on the surface upon which the magnetic layer is to be deposited. This film can be created by a variety of methods. The methods which have been used include oxidation in air, electrolytic anodic treatment in a variety of baths (including sulfuric acid, an electrolytic Ni-P plating bath, or an electrolytic Co-Ni-P plating bath), and treatment without applied current in oxidizing solutions such as nitric acid, sulfuric acid, or hydrogen peroxide. Other treatment methods can also be used to produce the same oxidizing effect.

The advantages of the properties obtained when using the oxidizing-treatment process lie in their effects on disk drive performance. With similar recording heads, the improved media drastically reduces bit error rate from that obtained using the media produced by the earlier processes. The advantages of oxidizing treatment as a process lie in the ability of the process to control the relevant properties. It is expected that in the future it will be necessary to controllably manipulate coercive force in the higher ranges which are made possible by the present invention.

DETAILED DESCRIPTION OF THE INVENTION

The essential feature of the invention is the provision of an oxidizing treatment to the underlayer surface prior to plating of the magnetics layer.

The optimum oxidizing treatment is dictated by several factors. Controllably increasing the degree of oxidizing treatment is found to controllably increase the coercive force, ultimately to very high levels, in excess of 1500 Oersteds. The ability to controllably increase the coercive force is one of the principal merits of this invention.

Another major feature of the oxidizing treatment is a significant decrease in media noise, and consequent increase in signal-to-noise ratio (SNR) for a given level of coercive force. Differing types of oxidizing treatments can lead to differing relationships between SNR and the coercive force, but in the practice of our invention we have observed that the SNR typically increases with increasing coercive force, as is often observed in thin-film magnetic layers.

In the practice of this invention, the type and degree of oxidizing treatment is chosen to achieve the desired coercive force and SNR. One preferred practice of the oxidation step makes use of a bath of 7% sulfuric acid in water. Immediately after the plating of the electrolytic Ni-P layer, the disks are rinsed in de-ionized water, and then electrolytically oxidation treated in the sulfuric acid bath. Anodic treatment conditions giving the desired combination of coercive force and media noise have been defined, though other combinations of anodic treatment current and time will also give excellent results.

The beneficial effects of oxidizing treatment in controlling coercive force and SNR are illustrated by the following examples. These demonstrate the wide variety of oxidizing treatments which can be used in the practice of this invention to control properties important to the performance of thin-film magnetic recording media. They also show some of the ways in which these treatment methods can be varied to accomplish this control.

EXAMPLE 1

Disks in Group A were plated using the conventional practice, similar to that taught in U.S. Pat. No. 4,581,109. These disks are typical of disks made by the conventional practice. Disks in Group B were plated using the improved process of the present invention, namely, with the addition of an oxidizing treatment immediately preceding plating of the magnetic layer. The oxidizing treatment comprised electrolyitc anodic treatment conducted for 20 to 25 seconds at a current of 0.14 ASF (amperes per square foot) in a 7% sulfuric acid bath. These disks are typical of those produced using the present invention.

Figure 1:
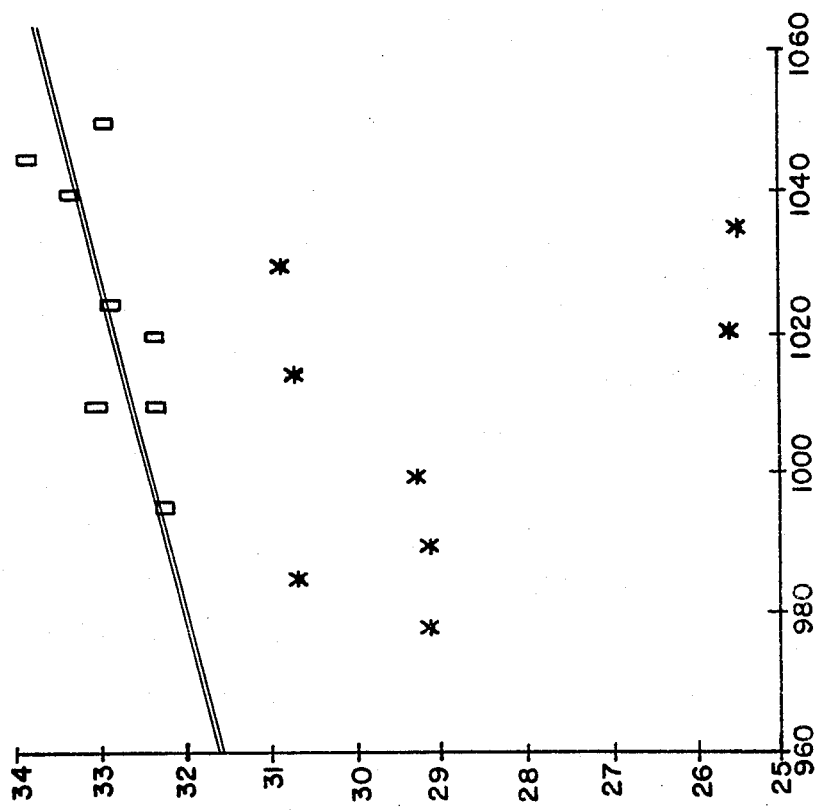
FIG. 1 is a plot of signal-to-noise ratios (in decibels) versus coercive force (in Oersteds).

The coercive force and SNR values for disks from Groups A and B are plotted in FIG. 1. Data from Group A are represented by stars and data from Group B are represented by open squares. This figure illustrates the previously-mentioned relationship between coercive force (Hc) and SNR for a given type of oxidizing treatment. Also shown is the variety of combinations of Hc and SNR obtained using the prior-art process; the process of this invention yields a consistent relationship between Hc and SNR, other things being equal. Most importantly, FIG. 1 shows that the process of this invention yields significantly higher SNR for a given coercive force than does the prior-art process.

In FIG. 1, the SNR was measured using a method which samples the noise at 8 different frequencies around the written data frequency. Because the ratios are expressed on a decibel scale, the differences are very significant for drive performance. This example clearly demonstrates the control of coercive force and improvement in SNR which are major features of the invention.

EXAMPLE 2

Figure 2:
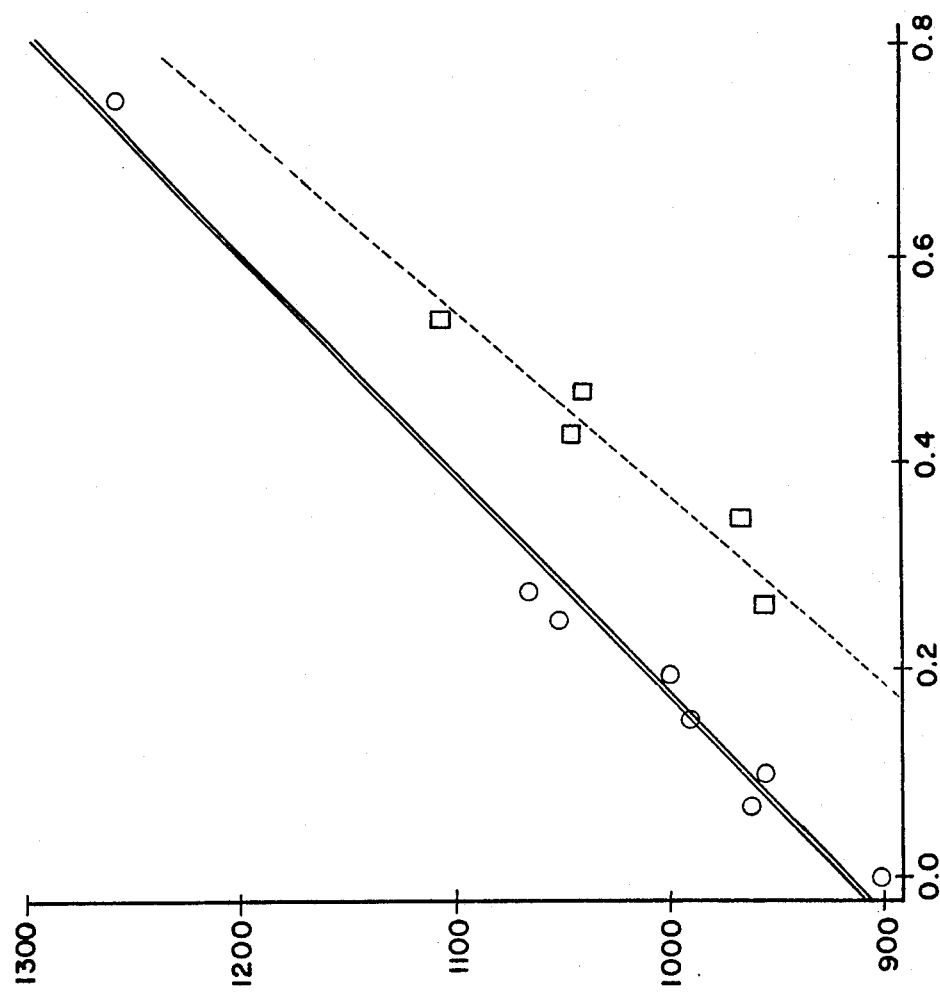
FIG. 2 is a plot of coercive force vs. anodic treatment current density (in amps per square foot).

A major advantage of this invention is the ability to control disk properties. In this example, summarized in FIG. 2, the anodic treatment current in sulfuric acid solution has been varied to control the coercive force over the range from 900 to 1260 Oersteds. Two curves are shown, one for 10 seconds treatment and another for 25 seconds, illustrating that anodic treatment time is also a variable which can be used to control the coercive force. Data obtained from material treated for 10 seconds is represented by open squares, while data obtained from material treated for 25 seconds is represented by open circles.

EXAMPLE 3

Figure 3:
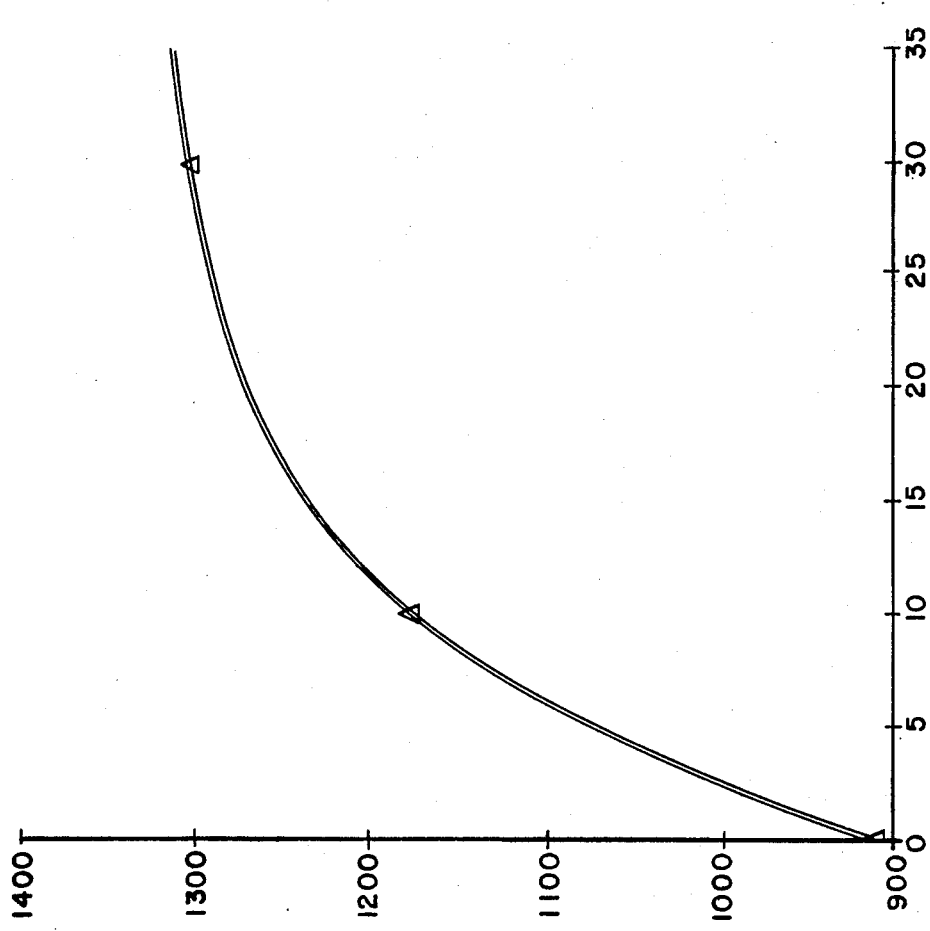
FIG. 3 is a plot of coercive force vs. anodic treatment time (in seconds).
Figure 4:
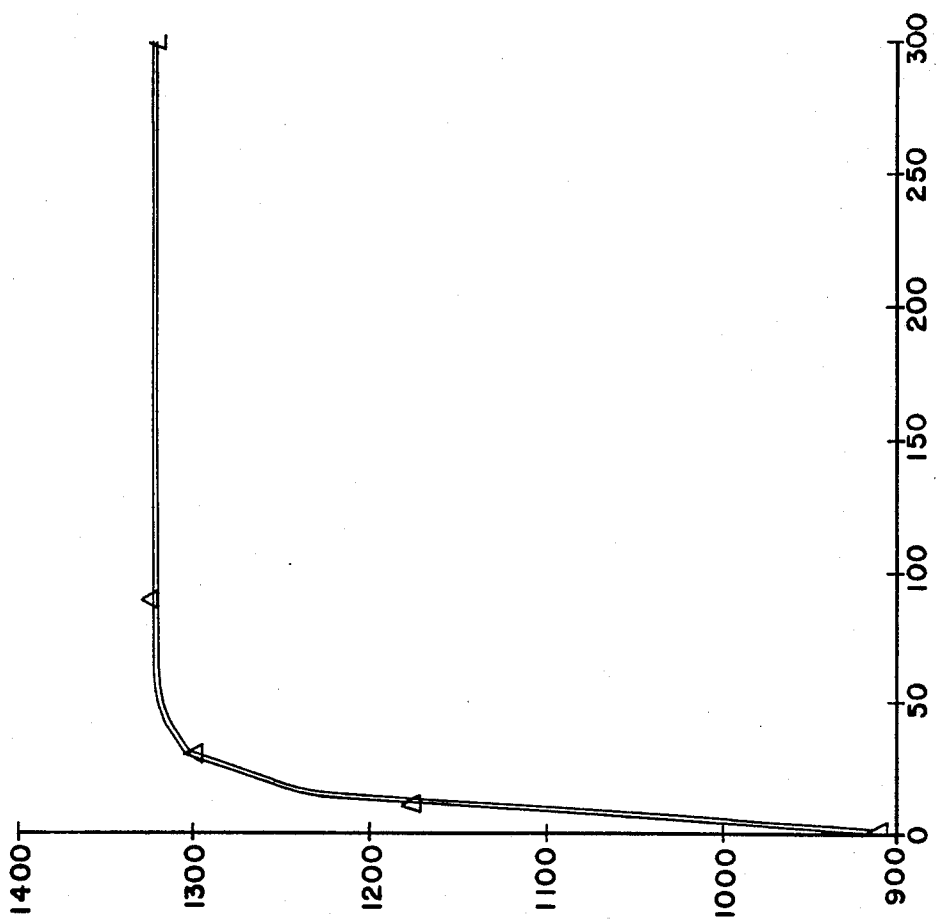
FIG. 4 is a plot of coercive force vs. anodic treatment time.

In this example, anodic treatment time has been varied while holding the anodic treatment current constant. FIG. 3 shows how coercive force can be controlled in this manner. In this case anodic current density was held constant at 0.28 amps per square foot. In FIG. 4, the duration of the anodic treatment has been extended, again at a current density of at 0.28 amps per square foot, showing that the curve of coercive force versus anodic treatment time reaches a plateau as time increases. In some cases, it may be advantageous to treat long enough to reach this plateau, the level of which is influenced by a number of factors including anodic treatment current and the type of anodic treatment bath.

EXAMPLE 4

Figure 5:
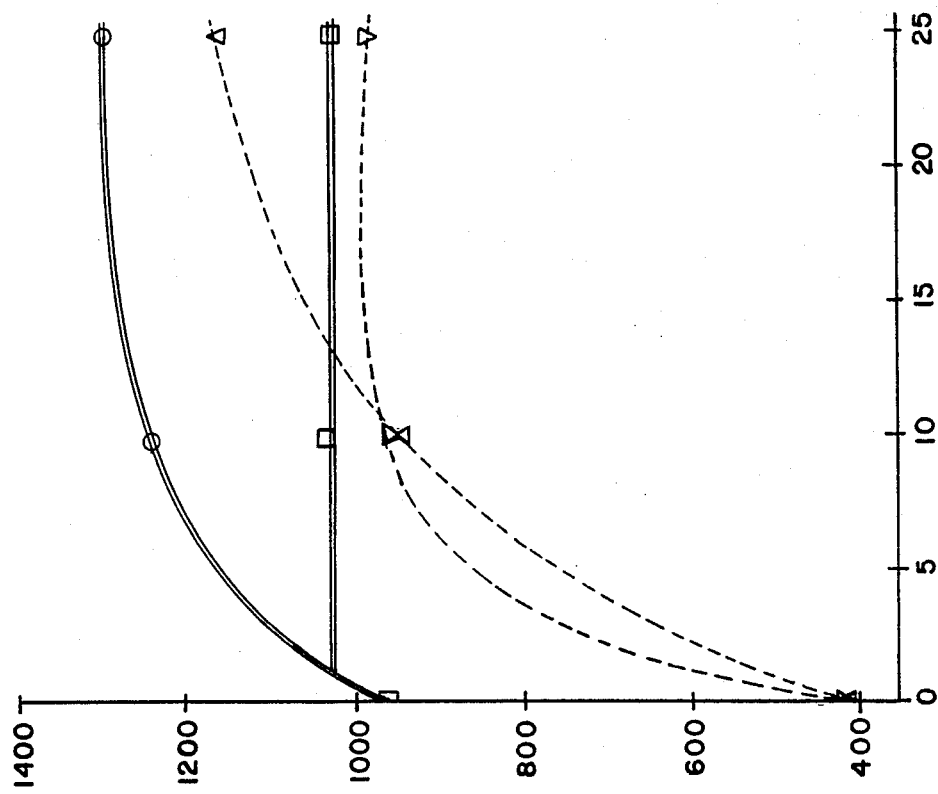
FIG. 5 is a plot of coercive force vs. anodic treatment time.

In the prior-art processes, variations in the condition of the surface upon which the magnetic layer is deposited can lead to undesired variations in properties. The present invention provides a method of overcoming these undesired variations in surface condition, and thus in disk properties. An example is shown in FIG. 5, which shows the effects of anodic treatment for various times and currents in an electrolytic solution with chemical composition typical of the magnetic plating bath of U.S. Pat. No. 4,581,109. In this figure, coercive force is shown as a function of anodic treatment time for two different current densities, 0.069 and 0.28 ASF. Data points obtained from media produced without prior cathodic treatment at current densities of 0.069 ASF and 0.28 ASF are represented as open squares and open circles respectively. Data obtained from media produced with prior cathodic treatment and then subjected to anodic treatment at current densities of 0.069 ASF and 0.28 ASF are represented as open triangles having apexes pointed downward and upward respectively. Also shown are the effects of applying these treatments to underlayer surfaces previously treated in two different manners. The top two curves, originating at 960 Oersteds, are for an electrolytic Ni-P surface having received no treatment prior to the anodic treatment. The ultimate coercive force reached with increasing treatment time is a function of the anodic current, and is higher for the higher current. The lower two curves, originating at 420 Oersteds, are for an electrolytic Ni-P surface which has received a cathodic treatment in sulfuric acid before the anodic treatment. The important conclusions are that the maximum coercive force in these cases is controlled primarily by the anodic treatment current, and not by the prior surface condition.

EXAMPLE 5

Figure 6:
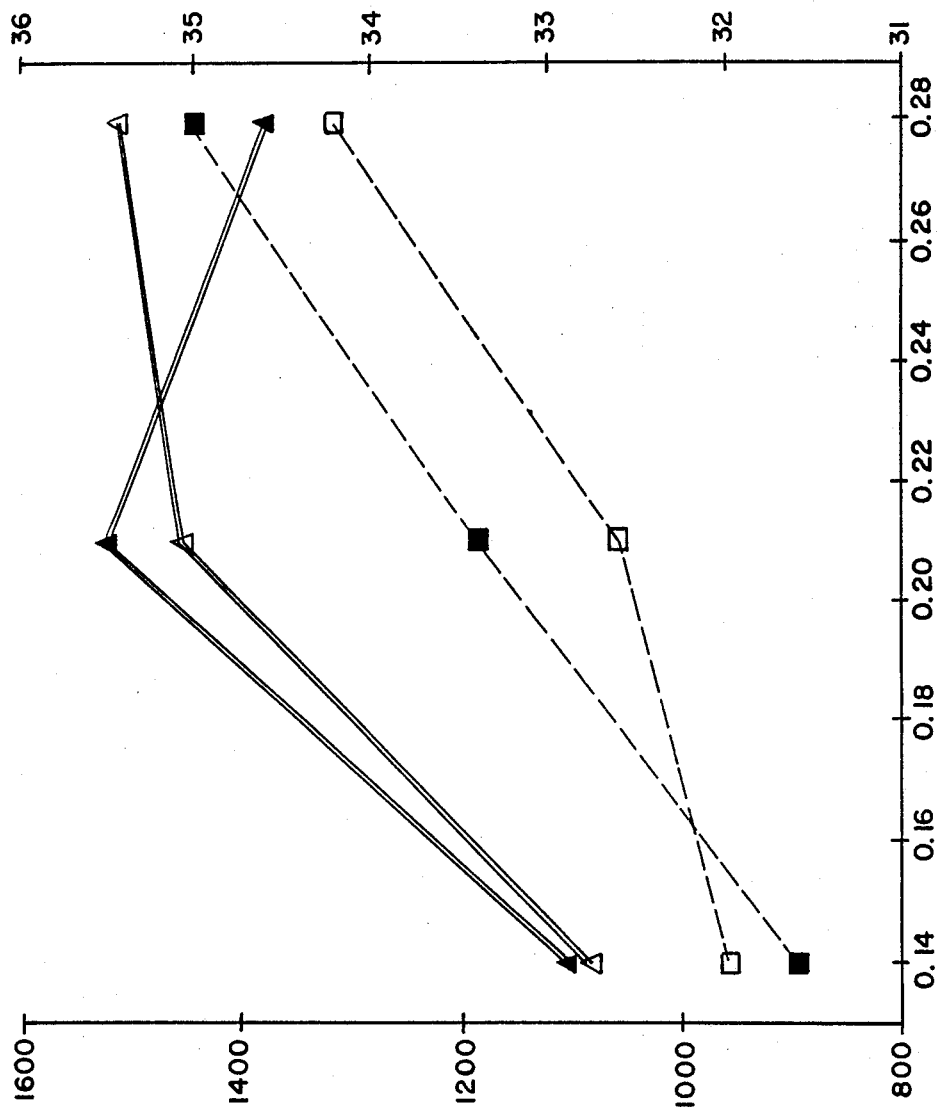
FIG. 6 is a plot of coercive force and signal-to-noise ratios vs. anodic treatment current density.

In this example, which is summarized in FIG. 6, the electrolytic treatment bath was of the type used for plating electrolytic Ni-P. The effects of treatment current density on coercive force (Hc) and SNR are shown for two different treatment times. Coercive force and signal-to-noise ratios obtained after 14 second treatment times are represented by open and filled squares respectively. Coercive force and signal-to-noise ratios obtained after 29 second treatment times are represented by open and filled triangles respectively. SNR in excess of 35 dB was obtained, with coercive force approaching 1500 Oersteds. This example further illustrates that electrolytic oxidizing treatment can be performed in a variety of types of baths. It also demonstrates that the higher coercive forces required for future generations of thin-film media can be controllably achieved with the oxidizing process.

EXAMPLE 6

In this example, disks in Group A were plated without the electrolytic Ni-P layer. After cleaning of the polished electroless nickel on the substrates, an anodic treatment of 25 seconds at 0.28 ASF was applied in a bath of 7% sulfuric acid in water. A Co-Ni-P magnetics layer was then plated on the disks in the usual manner. Disks in Group B were plated using the prior-art process, including the electrolytic Ni-P layer, without any oxidizing treatment before plating of the magnetic layer.

| Treatment | Coercive Force, Oersteds | S/N, dB |
|---|---|---|
| Group A | 1166 | 35.6 |
| Group B | 951 | 31.5 |

This example shows that the electrolytic Ni-P layer is not essential for the practice of the oxidizing process, but that the amorphous electroless Ni-P layer also provides an effective base layer for application of the process.

EXAMPLE 7

Oxidation in air can be used to obtain the benefits of the oxidizing process. In this example, a group of disks was plated with electrolytic Ni-P, then rinsed and dried. These disks were allowed to remain in air for 7 days, at the end of which time they were reintroduced into the plating line just before the magnetics plating step. The properties of these disks were superior to those of other disks plated at about the same time, but which had not been subjected to any form of oxidizing treatment preceding the plating of the magnetic layer.

| Treatment | Coercive Force, Oe | S/N, dB |
| --- | --- | --- |
| Air oxidation | 1307 | 35.0 |
| No oxidizing treatment | 951 | 31.5 |

EXAMPLE 8

Prior to plating of the magnetic layer, disks plated with electrolytic Ni-P were dipped in a solution of 7% sulfuric acid in deionized water. There was no external electrical connection between the disks and the counterelectrodes. Thus the treatment relies on the oxidizing potential of the sulfuric acid bath. In the following table, "Dwell Time" denotes the duration of the sulfuric acid treatment. Subsequent magnetic plating was performed in a manner described in U.S. Pat. No. 581,109.

| Dwell Time, minutes | Coercive Force, Oersteds |
| --- | --- |
| 0 | 995 |
| 0 | 945 |
| 2 | 1095 |
| 10 | 1145 |
| 10 | 1180 |
| 15 | 1145 |

EXAMPLE 9

The following example is similar to Example 8. No current was used during the oxidizing treatment. However, in this example, an acid of higher oxidizing potential, nitric acid, was used. The table below shows results for nitric acid solutions of different molarity and for different dwell times in the acid solution. The coercive force without treatment is less than that in Example 5 because of different magnetic plating conditions. Data shown are the average of two observations.

| Acid Concentration, M/l | Dwell Time, minutes | Coercive Force, Oersteds |
| --- | --- | --- |
| No oxidizing treatment | — | 875 |
| 0.01 | 0.5 | 1010 |
| 0.01 | 1.5 | 1095 |
| 0.01 | 5.0 | 970 |
| 0.1 | 0.5 | 1123 |
| 0.1 | 1.5 | 1105 |
| 0.1 | 5.0 | 1093 |
| 1.0 | 0.5 | 1023 |
| 1.0 | 1.5 | 1020 |
| 1.0 | 5.0 | 1135 |

EXAMPLE 10

In this example, disks with electrolytic Ni-P were dipped for 2 minutes in solutions of hydrogen peroxide in deionized water prior to magnetics plating. This example further illustrates the variety of oxidizing treatments which can be used in the process of the present invention.

| Hydrogen Peroxide Concentration, % | Coercive Force, Oersteds |
| --- | --- |
| 0 | 955 |
| 0.1 | 1000 |
| 1 | 1120 |
| 5 | 1170 |
| 30 | 1275 |

EXAMPLE 11

Figure 7:
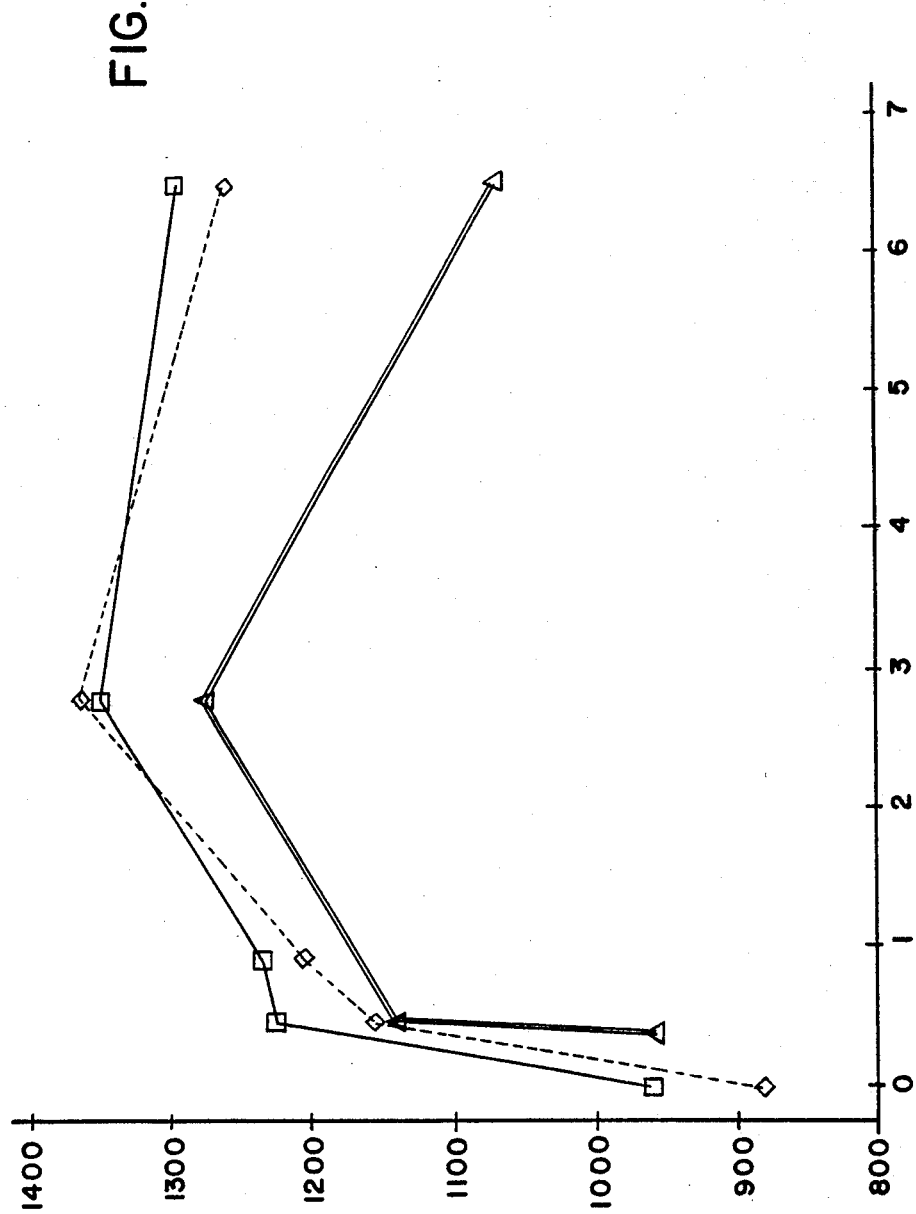
FIG. 7 is a plot of coercive force vs. anodic treatment current density.

In this example, the anodic treatment times were short, from 0.5 to 2.0 seconds, and the anodic treatment current densities commensurately greater than in previous examples. The coercive force values for these short-time treatments are shown in FIG. 7 as a function of anodic treatment current density, demonstrating that the coercive can be manipulated in this way. Data obtained from media subjected to treatment for 0.5 seconds, 1.0 second and 2.0 seconds are represented by triangles, diamonds and squares respectively. This example illustrates that a variety of anodic treatment current densities and treatment times can be used in electrolytic oxidizing treatments.

EXAMPLE 12

Figure 8:
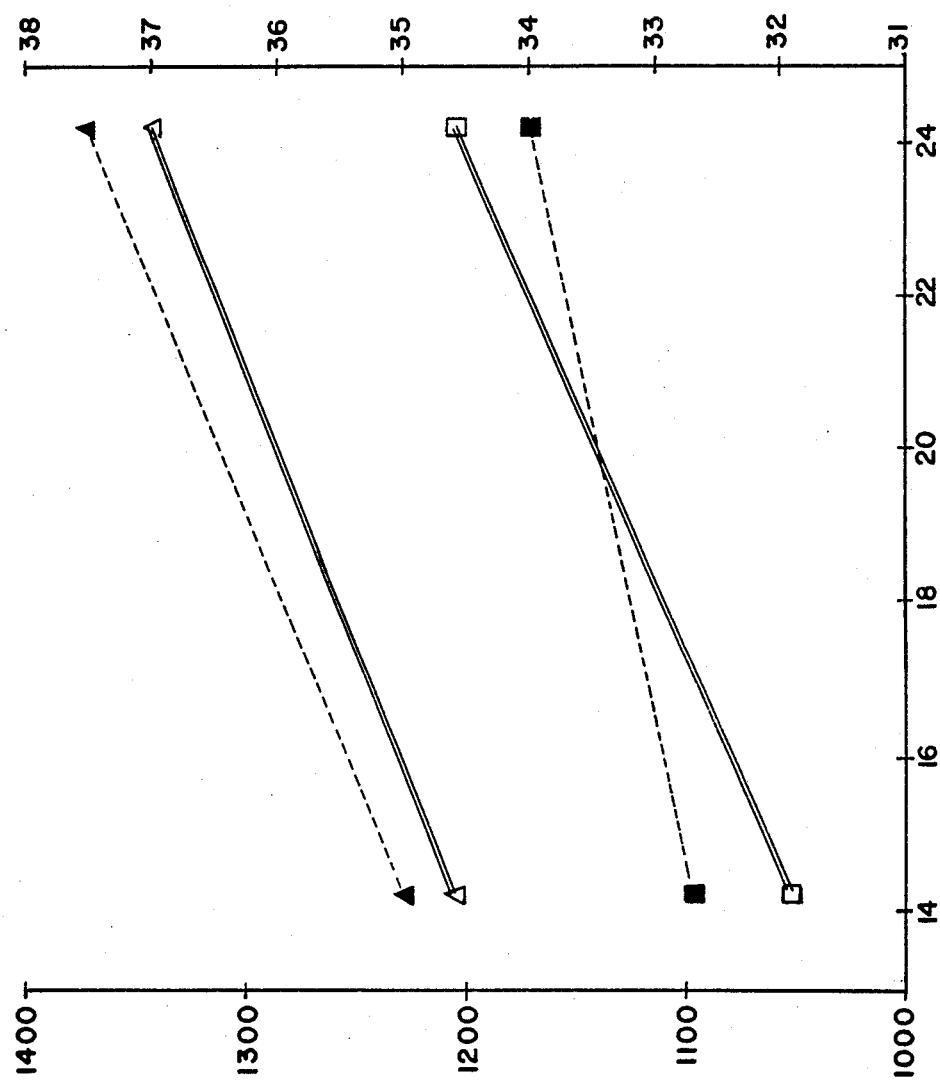
FIG. 8 is a plot of coercive force and signal-to-noise ratios vs. anodic treatment current density.

The oxidizing treatment in this example was performed using electrolytic anodic treatment in a Co-Ni-P plating bath similar to that used in Example 4, but under slightly different plating conditions in a different plating cell. FIG. 8 shows the coercive force and SNR obtained by anodically treating at two different current densities and for two different times of treatment. By this treatment, high SNR can be obtained. Coercive force and signal-to-noise ratios for media subjected to a current density of 0.07 ASF are represented by open and filled squares respectively. Coercive force and signal-to-noise ratios for media subjected to a current destiny of 0.14 ASF are represented by open and filled triangles respectively.

We claim:

1. A process for the production of magnetic recording media comprising the steps of:
    oxidizing the surface of a layer of an amorphous substrate, and
    depositing a layer of magnetic material on the oxidized surface of the substrate.

2. The process of claim 1 wherein the surface of the substrate is oxidized by appication of oxidizing treatments selected from the group consisting of exposure to oxygen, acid baths, hydrogen peroxide baths and electrolytic baths.

3. The method of claim 2 wherein the magnetic material is electrolytically deposited on the substrate.

4. The method of claim 3 wherein the oxidizing treatment is an electrolytic anodic treatment in a bath of sulfuric acid for from 0.1 to 900% seconds at a current flow of from 0.014 to 14 amps/sq. ft.

5. The method of claim 4 wherein said anodic treatment is for 15 to 30 seconds at about 0.14 amps/ft.$^2$ and said bath is 7% sulfuric acid.

6. The process of claim 3 wherein the oxidizing treatment is exposure to air for from 0.1 to 10 days.

7. The process of claim 3 when the oxidizing treatment is exposure to sulfuric acid bath for from 2 to 15 minutes.

8. The process of claim 7 wherein the exposure is for from 5 to 15 minutes.

9. The process of claim 3 wherein the oxidizing treatment is exposure to a nitric acid bath for from 0.1 minutes to about 5 minutes.

10. The process of claim 3 wherein the oxidizing treatment is exposure to a 0.1 molar nitric acid bath for from 0.5 to 5.0 minutes.

11. The process of claim 3 wherein the oxidizing treatment is exposure to a bath of at least 0.1% hydrogen peroxide for at least one minute.

12. The process of any one of claims 1 through 11 wherein the substrate is comprised of a layer of Ni-P material.

13. The process of claim 12 wherein the magnetic material is a Co-Ni-P material.

14. The process of any one of claims 1 through 11 wherein the magnetic material is a Co-Ni-P material.

15. The method of claim 2 wherein the magnetic material is deposited on the substrate by electroless deposition.

16. The method of claim 15 wherein the oxidizing treatment is an anodic treatment in a bath of sulfuric acid for from 0.1 to 900 seconds at a current flow of from 0.014 to 14 amps/ft.$^2$.

17. The method of claim 15 wherein said anodic treatment is for 15 to 30 seconds at about 0.14 amps/ft.$^2$ and said bath is 7% sulfuric acid.

18. The process of claim 15 wherein the oxidizing treatment is exposure to air for from 0.1 to 10 days.

19. The process of claim 15 wherein the oxidizing treatment is exposure to sulfuric acid bath for from 2 to 15 minutes.

20. The process of claim 15 wherein the oxidizing treatment is exposure to a nitric acid bath for from 0.1 minutes to about 5 minutes.

21. The process of claim 15 wherein the oxidizing treatment is exposure to a 0.1 molar nitric acid bath for from 0.5 to 5.0 minutes.

22. The process of claim 15 wherein the oxidizing treatment is exposure to a bath of at least 0.1% hydrogen peroxide for at least one minute.

23. The process of any one of claims 15 through 22 wherein the substrate is comprised of a layer of Ni-P material.

24. The process of any one of claims 15–22 wherein the magnetic material is a Co-Ni-P material.

25. The process of claim 24 wherein the substrate material is a Ni-P material.

* * * * *